3,493,005
CONSTANT FLOW RATIO CONTROL SYSTEM FOR GAS FLOW LINES
Yasuo Kakegawa, Tokyo, Japan, assignor to Tokyo Gas Company Limited, Tokyo, Japan
Filed May 15, 1968, Ser. No. 729,234
Claims priority, application Japan, May 15, 1967, 42/30,721
Int. Cl. G05d *11/02;* F23n *1/02*
U.S. Cl. 137—100                                    1 Claim

ABSTRACT OF THE DISCLOSURE

A control system for maintaining the flow ratio of gases in two gas flow lines constant. Two pressure equalizing valves are provided in the first line, one upstream of and the other downstream of a metering orifice which controls the flow of gas in said first line. One side of the gas pressure differential responsive means in each valve is in communication with the portion of the first gas line between the respective valve and the orifice in said first line, and the other side of the differential responsive means in each valve is in communication with the corresponding portion of the second gas line upstream of and downstream of the orifice in said second gas line. A change in pressure conditions upstream or downstream of the orifice in said second gas line will cause movement of the respective valves in said first line to adjust the pressure on the corresponding side of the orifice in said first line to maintain the ratio of flow of gases in said first and second lines constant, and a change in pressure conditions downstream of the downstream valve in said first line will cause movement of the downstream valve in said first line to maintain the ratio of flow of gases constant.

---

This invention relates to an arrangement for preventing variations in the flow ratio of air and fuel gas in such situations where the resistances to the flow of the air and the gas vary widely because they both preheated downstream of a control point for subsequent combustion or because of the presence of an obstacle in the air or gas piping system which may cause a change in the pressure resistance irrespective of the flow rate of either the air or the gas. More particularly, the invention relates to a controller for air-gas flow which can maintain a constant flow ratio independently of the pressure resistance to the flow of the air and the gas.

The controller of the present invention has two pressure equalizing valves, one upstream of and the other downstream of a metering orifice in a gas pipe, and a pressure equalizing valve which is located downstream of the orifice. Each equalizing valve has gas pressure differential responsive means for moving the valve to control the gas flow in said gas line. One side of said differential responsive means in each valve is in communication with the portion of the gas line between the respective valve and the orifice in said gas line, and the other side of the differential responsive means in each valve is in communication with the corresponding portion of the air line upstream of and downstream of the orifice in said air line. A change in pressure conditions upstream or downstream of the orifice in said air line will cause movement of the respective valves in said gas line to adjust the pressure on the corresponding side of the orifice in said gas line to maintain the ratio of flow of gases in said gas and air lines constant, and a change in pressure conditions downstream of the downstream valve in said gas line will cause movement of the downstream valve in said gas line to maintain the ratio of flow of gases constant.

Figure 1:
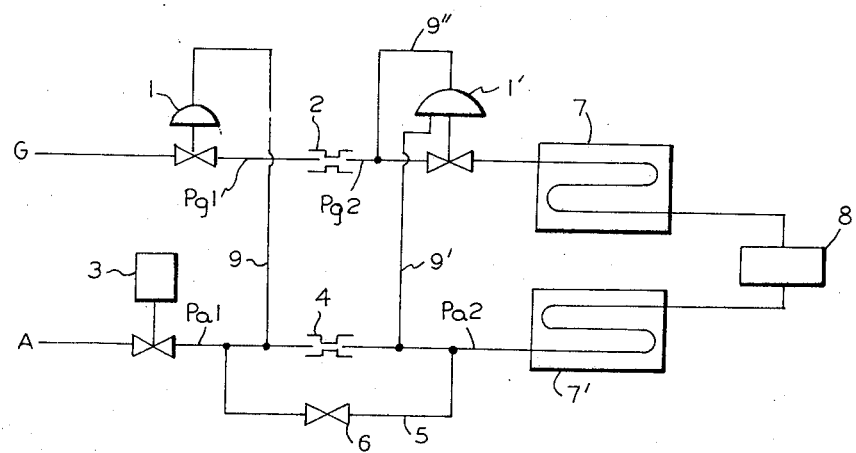
Figures 2A, 2B:
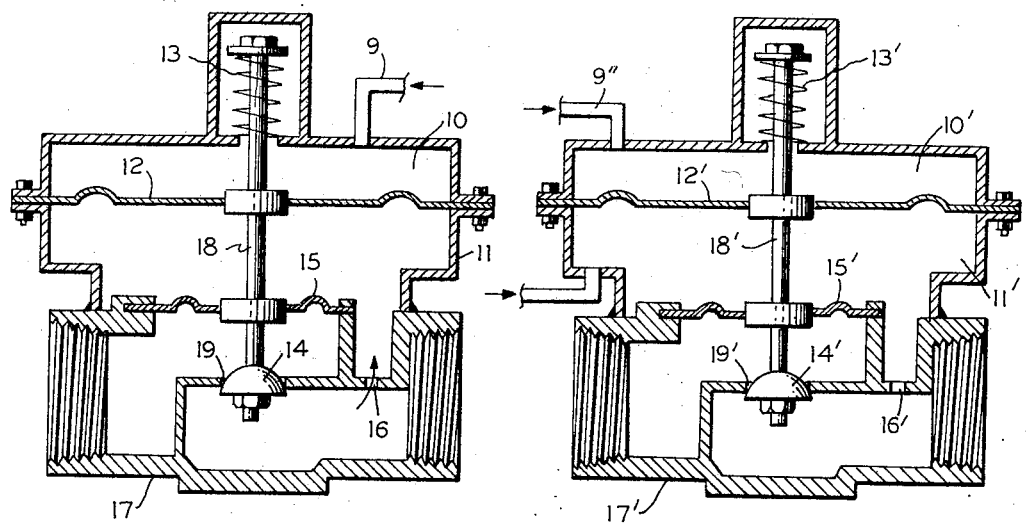
Figure 3:
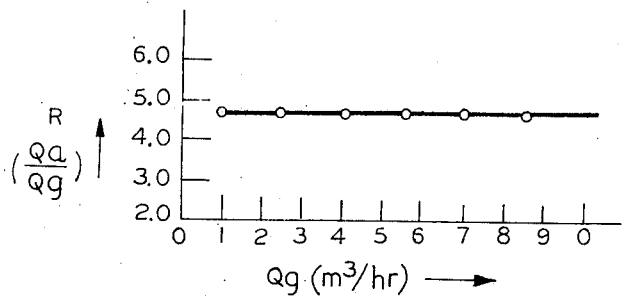
Figure 4:
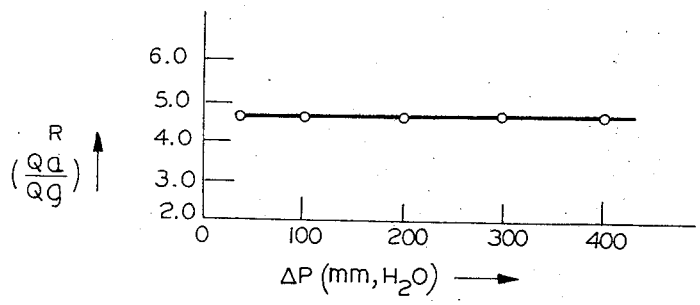
Figure 5:
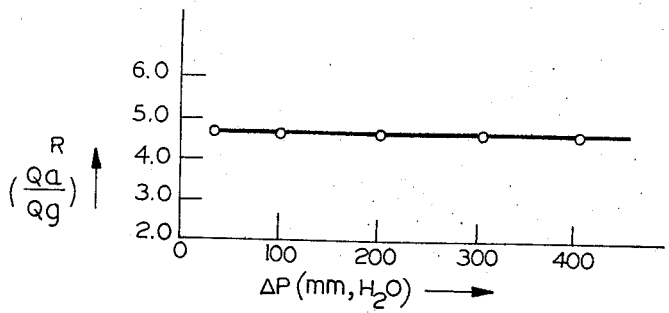

The invention will now be described in more detail in connection with the accompanying drawings showing an embodiment thereof and in which:

FIG. 1 is a schematic view of the controller of the invention;

FIGS. 2(a) and 2(b) are enlarged sectional views of the pressure equalizing valves; and FIGS. 3–5 are graphs showing performance characteristics of the embodiment shown in FIGS. 1 and 2.

Referring specifically to FIG. 1, a gas line G has two pressure equalizing valves 1 and 1' therein which are respectively upstream of and downstream of a metering orifice 2 in the line. An air line A has an automatic throttling valve or hand-operated valve 3 therein and an air metering orifice 4 therein. A bypass 5 is provided around the orifice 4 in the air line, and a cock 6 is provided in the bypass for flow ratio setting. By way of exemplification of obstructions to fluid flow which can exist in the lines G and A, heat exchangers 7 and 7' for preheating air and gas are shown. Any other obstruction can be present which can vary the pressure resistances independently of the flow rates. A burner 8 is provided at the ends of lines G and A.

A pressure conducting tube 9 is connected between the upper portion of pressure equalizing valve 1 and the air line A for introducing the pressure $Pa1$ in the air line upstream of orifice 4 to the upper portion of the pressure equalizing valve 1, and a similar pressure conducting tube 9' is connected between the lower portion of pressure equalizing valve 1' and the air line A for introducing the pressure $Pa2$ downstream of the orifice 4 to the lower portion of the pressure equalizing valve 1'. Another pressure conductive tube 9" is connected between the gas line G and the upper side of pressure equalizing valve 1' for introducing the pressure $Pg2$ of the gas line downstream of the orifice 2 to the upper portion of the pressure equalizing valve 1'. The orifice 2 in the gas line and the orifice 4 in the air line have cross sectional areas designed so that gas and air at a predetermined flow ratio can pass therethrough when the gas pressure $Pg1$ is equalized with the air pressure $Pa1$ and also the gas pressure $Pg2$ is equalized with the air pressure $Pa2$, that is, when the differential pressure across the gas orifice 2 becomes equal to that across the air orifice 4. For the setting of the ratio of flow rates, the area of the air orifice 4 is made smaller than that of the calculated value by about 10 percent, and the air flow is adjusted with the cock 6 provided for that purpose in the bypass 5. With such a construction, air passes through the automatic throttling valve or hand-operated valve 3 and has the pressure reduced thereby to pressure $Pa1$, and is led through the pressure conductive tube 9 into the upper portion of the pressure equalizing valve 1. Meanwhile, pressure $Pg1$ is communicated to the lower portion of the equalizing valve 1.

The equalizing valves have upper chambers 10 and 10' and lower chambers 11 and 11' separated by diaphragms 12 and 12', respectively. A hole 16 is provided between valve housing 17 and lower chamber 11 for the purpose of supplying pressure $Pg1$ to lower chamber 10 of regulating valve 1. Pressures $Pa1$ and $Pg1$ are regulated so as to be equal by regulating springs 13 and 13' which are connected to stems 18 and 18', which in turn are connected to diaphragms 12 and 12', and act to move valve members 14 and 14' sitting in seats 19 and 19' in housings 17 and 17'. The influence which the gas pressure before its entry into the lower portion 11 of the equalizing valve 1 exercises upon pressure $Pg1$ is completely offset by the action of a balancing diaphragm 15 which has the same area as a valve member 14 and which is secured in an opening between housing 17 and lower chamber 11 and is also attached to stem 18. Similarly, the air pressure $Pa2$ on the downstream side of the air orifice 4 is supthrough the pressure conducting tube 9' to the lower
[porti]on 11' of the equalizing valve 1', wherein it is op-
[pose]d to the pressure Pg2 of gas on the downstream side
[of th]e gas orifice 2 supplied through the pressure conduct-
[ing] tube 9" to the upper portion 10' of the pressure
[equa]lizing valve 1'. The two pressures are kept equal by
[forc]e of a regulating spring 13'. In this case, the effect
[of p]ressure Pg2 upon the valve member 14' is com-
[plet]ely nullified by a balancing diaphragm 15' having the
[sam]e area as the valve 14'.

[If] the flow rate of the air is altered by changing the
[setti]ng of the control valve or hand-operated valve 3, the
[pres]sure equalizing valves 1 and 1' operate in the manner
[as a]bove described and control the pressures upstream
[and] downstream of the gas orifice 2 so that they are
[equ]alized with the corresponding pressures on opposite
[side]s of the air orifice 4, and hence the ratio of flow rates
[of t]he gas and air can be kept constant.

[T]he results thus attained are graphically shown in
[FIG]. 3. The flow rate Qg of gas in m.³/hr. is plotted on
[the] abscissa and the ratio $R=Qa/Qg$ of the flow rates,
[the] flow rate Qa of air also being in m.³/hr. is plotted on
[the] ordinate. As shown in FIG. 3, when the flow rate of
[gas] is changed by means of the control valve or hand-
[ope]rated valve 3, the flow ratio R remains constant while
[gas] is within the range of 1 m.³/hr. to 10 m.³/hr.

[I]f, for example, air is heated by the heat exchanger
[7 a]nd the volume is expanded, the total pressure resist-
[anc]e ΔPa throughout the line from the air orifice to the
[bur]ner 8 is increased. Simultaneously with the consequent
[inc]rease of Pa2, the opening of the valve 14' of the pres-
[sur]e equalizing valve 1' is decreased and Pg2 is increased
[unt]il Pa2 and Pg2 are equal. Accordingly, the difference
[bet]ween pressure downstream of the gas orifice 2 and that
[dow]nstream of air orifice 4 is reduced to zero. In other
[wo]rds, the ratio of flow rates R is not changed by any
[cha]nge of the air resistance due to preheating by the heat
[exc]hanger 7'. The characteristics of the apparatus during
[suc]h an operation are shown in FIG. 4, in which the pres-
[sur]e resistance ΔPa in mm. H₂O is plotted on the abscissa
[and] ratio of flow rates R on the ordinate.

[I]f the gas is heated by the heat exchanger 7 and there
[is] a consequent increase in the total pressure resistance
[ΔP]g of the gas in the heat exchanger 7 and the burner 8,
[Pg]2 will temporarily rise. This in turn will open the valve
[me]mber 14' of equalizing valve 1' more, with the result
[tha]t Pg2 will again be decreased until it is equal to Pg2.
[Th]us, even if the pressure resistance in the heat exchanger
[7 a]nd the burner 8 is increased, the valve member 14' of
[the] equalizing valve 1' if opened further, and the pres-
[sur]e resistance is decreased proportionally to the incre-
[me]nt of the pressure resistance. As a result, the difference
[bet]ween pressure on the downstream side of the gas orifice
[2] and the air orifice 4 is reduced to zero and the ratio of
[flo]w rates is kept constant. The characteristics of the
[ap]paratus during changes of ΔPg when ΔPa is 400 mm.
[H₂]O are shown in FIG. 5, in which ΔPg in mm. H₂O is
[pl]otted on the abscissa and the ratio of flow rates R is
[pl]otted on the ordinate.

As explained hereinabove, the present invention enables the maintenance of a constant ratio of flow rates between fuel gas and air by control of the flow rates with two pressure equalizing valves in such a way that the pressures upstream and downstream of the orifice in the gas line can be kept equal to the corresponding pressures at the orifice in the air line. By such an arrangement, the fuel gas and air can be kept at a predetermined ratio of flow rates regardless of any changes in the pressure resistances due to preheating of the gas or air for a combustion apparatus.

While in the above disclosed embodiment of the invention changes in pressure resistances are due to heat exchangers, it is also possible to maintain a stable flow ratio over an extensive range of flow rates in the same way where resistors cause changes in the pressure resistances irrespective of the flow rates in the air and gas lines.

What is claimed is:

1. In a gas flow system having a first and a second gas flow line each having a metering orifice therein, a control system for maintaining the flow ratio of the gases in the respective flow lines constant comprising two pressure equalizing valves in the first line, one upstream of and the other downstream of the orifice in said first line and movable to control the flow of gas in said first line, each equalizing valve having gas pressure differential responsive means for moving the valve to control the gas flow in said first line, one side of said differential responsive means in each valve being in communication with the portion of the first gas line between the respective valve and the orifice in said first line, and the other side of the differential responsive means in each valve being in communication with the corresponding portion of the second gas line upstream of and downstream of the orifice in said second gas line, whereby a change in pressure conditions upstream or downstream of the orifice in said second gas line will cause movement of the respective valves in said first line to adjust the pressure on the corresponding side of the orifice in said first line to maintain the ratio of flow of gases in said first and second lines constant, and a change in pressure conditions downstream of the downstream valve in said first line will cause movement of the downstream valve in said first line to maintain the ratio of flow of gases constant.

References Cited

UNITED STATES PATENTS

| | | | |
|---|---|---|---|
| 1,290,513 | 1/1919 | Collins et al. | 137—100 X |
| 2,379,633 | 7/1945 | Garretson | 137—98 X |
| 2,395,384 | 2/1946 | Ziebolz | 137—98 X |
| 2,719,080 | 9/1955 | Schmidt et al. | 137—98 X |
| 2,823,740 | 2/1958 | Morck | 431—12 X |

WILLIAM F. O'DEA, Primary Examiner

DAVID J. ZOBKIW, Assistant Examiner

U.S. Cl. X.R.

431—12